June 20, 1967 H. K. WALTERS, JR 3,326,666
SUSPENSION FERTILIZERS FROM CONCENTRATED SUPERPHOSPHATES
Filed June 29, 1964 2 Sheets-Sheet 1

Henry K. Walters, Jr. INVENTOR.

BY Robert A. Petrusek
   agent

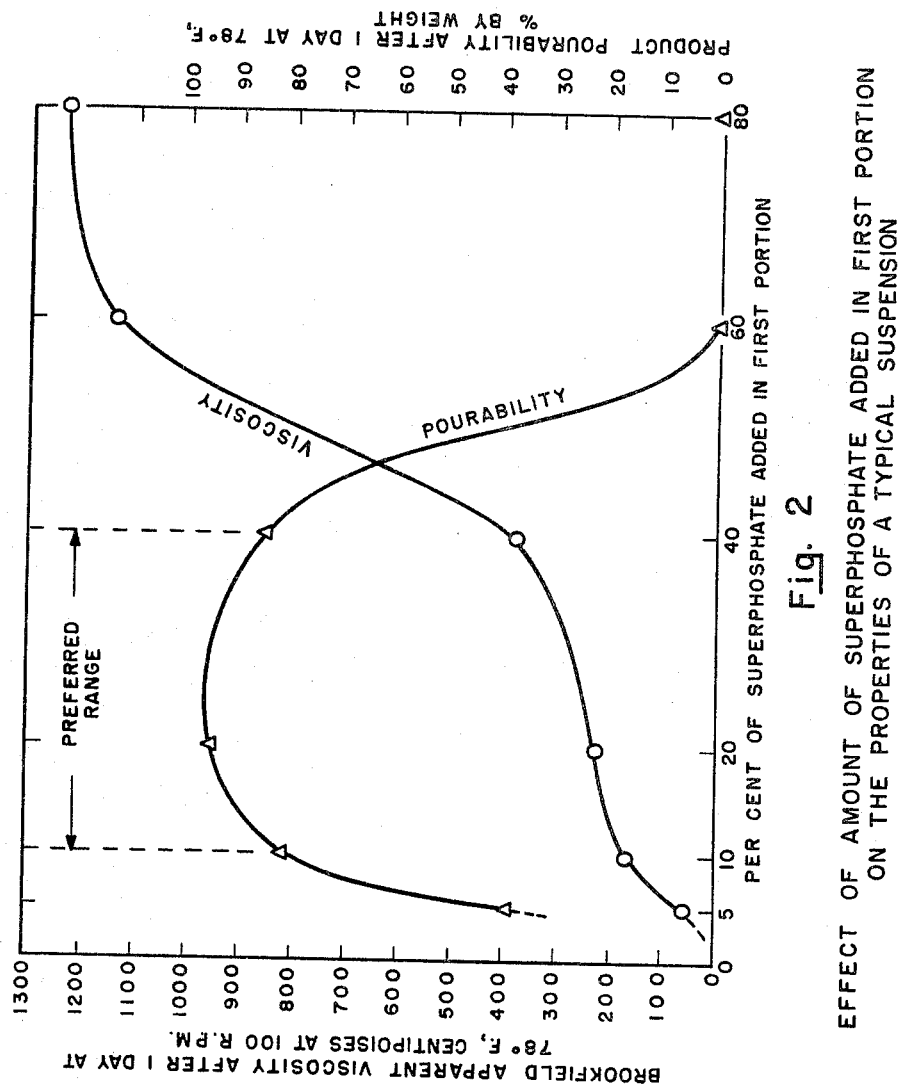

United States Patent Office 3,326,666
Patented June 20, 1967

3,326,666
SUSPENSION FERTILIZERS FROM CONCENTRATED SUPERPHOSPHATES
Henry K. Walters, Jr., Florence, Ala., assignor to Tennessee Valley Authority, a corporation of the United States
Filed June 29, 1964, Ser. No. 379,057
2 Claims. (Cl. 71—29)

The invention herein described may be manufactured and used by or for the Government for governmental purposes without payment to me of any royalty thereon.

My invention relates to a process for the production of high-analysis suspension fertilizers, particularly fertilizer suspensions having superphosphates as the phosphate source, and more particularly to a novel process of utilizing superphosphate in such a manner that it imparts superior physical properties to suspensions containing one or more solid fertilizer salts in a saturated aqueous solution of the same salts.

The production and use of suspension fertilizers having compositions similar to those of dry fertilizers have been known, and such fertilizers are increasing in use in the industry. Suspension fertilizers have several advantages over dry mixed fertilizers in that processing steps such as water evaporation, granulation, and bagging are eliminated. Since the suspension fertilizers are in a fluid form they can be transferred though pipes by pumping and can be sprayed on the soil through nozzles, thereby reducing the amount of labor and time involved in handling and applying. Other advantages realized in the use of suspension fertilizers are that the consumer can be supplied with formulations to fit his soil requirements, including micronutrients and pesticides, and the manufacturer can custom-mix these formulations in small low-cost plants located near the market areas.

However, suspension fertilizers produced by prior-art methods had some outstanding disadvantages. Raw-material costs for phosphate, which is normally supplied in the form of phosphoric acid or ammoniated phosphoric acid, are relatively expensive as compared to the concentrated superphosphate used in making solid fertilizers. Also, the requirement by prior-art methods of a suspending agent to prevent settling increases the raw-material costs and introduces extra processing steps and requires the use of additional equipment. These requirements of the prior art for use of relatively expensive phosphoric acid and the requirement for a suspending agent may be readily apparent by a reading of the disclosure of U.S. Patent 3,113,858, of which I am a coinventor.

It is therefore an object of the present invention to provide a process for the manufacture of high-analysis fluid fertilizer suspensions which have the advantageous fluid form while utilizing inexpensive concentrated superphosphate as the phosphate source.

Another object of the present invention is to provide such process in which difficulties due to formation and settling of precipitates formed by reaction of ammonia and concentrated superphosphate are eliminated.

Still another object of the present invention is to provide a process for the manufacture of substantially nonsettling suspensions of fertilizer salts having good flow properties and acceptable viscosity without the requirement of adding a suspending agent.

A further object of the present invention is to provide a process for utilizing more inexpensive ammonia nitrogen per unit of $P_2O_5$ from concentrated superphosphate than can be effectively used in solid fertilizers.

A still further object of the present invention is to provide a process for precipitating calcium ammonium phosphate in such a manner that it stabilizes suspension fertilizers containing one or more solid fertilizer salts in a saturated aqueous solution of the same salts.

In the present invention these objects are attained by a unique sequence of mixing steps in which superphosphate is ammoniated in an aqueous suspension alone or in the presence of one or more fertilizer materials. I have discovered that beneficial properties are imparted to the products by a stable gel of calcium ammonium phosphate precipitated during the mixing steps, to the extent that the addition of a suspending agent is not required in a process for production of stable suspensions of fertilizer salts having desirable flow properties and an acceptable viscosity.

My invention, together with its objects and advantages thereof, will be better understood from the following description and the accompanying drawing in which:

FIGURE 2 is a graphical illustration depicting the pourability and viscosity characteristics of a typical fertilizer suspension produced by my process.

Figure 1:
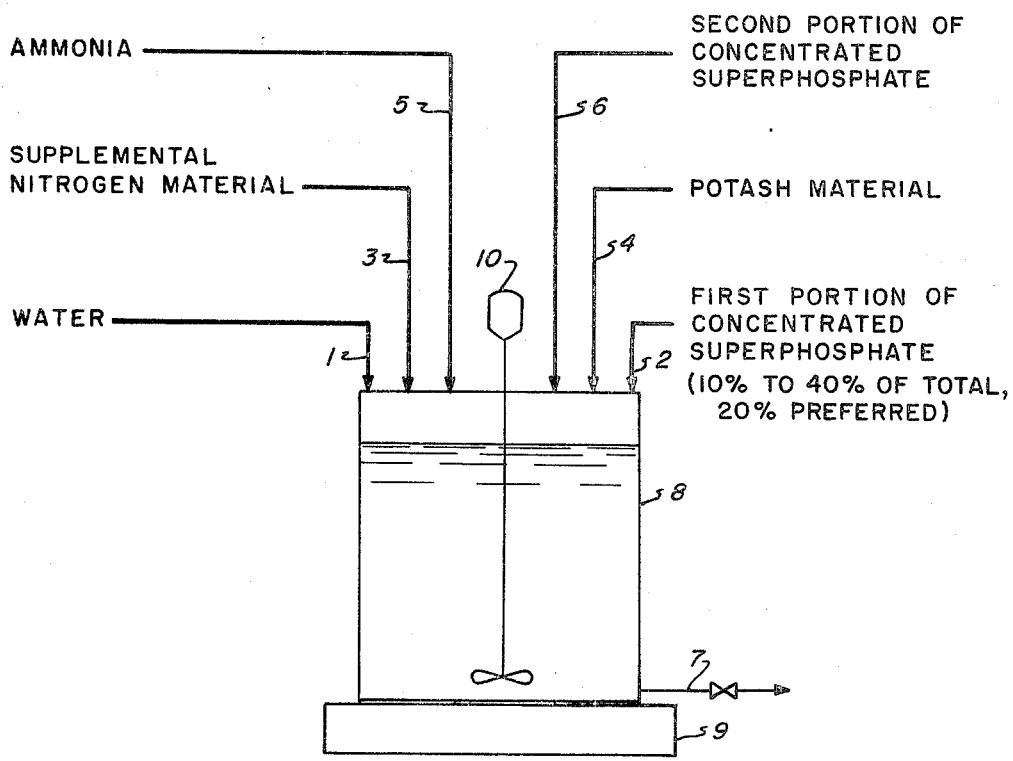
FIGURE 1 is a diagrammatical drawing illustrating the sequence of mixing steps in carrying out the process.

Referring now more specifically to FIGURE 1, there is shown one modification of my invention carried out in a batchwise operation. After the water for a specific suspension formulation has been introduced via line 1 into mixing tank 8, an essential portion, usually about 20 percent, of the concentrated superphosphate for the formulation is added to mixing tank 8 via line 2. Mixing tank 8 is mounted on scales 9 and is equipped with agitator 10 that is operated throughout all the mixing steps. These two ingredients are mixed for a short period of time, usually about 1 to 10 minutes, before the other raw materials are weighed rapidly into the batch in mixing tank 8, usually in the following order: supplemental nitrogen material, ordinarily a solution containing urea and ammonium nitrate, via line 3; the materials which act as a source of potash, usually potassium chloride, via line 4; ammonia via line 5; and the remainder, usually about 80 percent, of the concentrated superphosphate via line 6. Mixing is then continued for about 5 minutes after addition of the remainder of the concentrated superphosphate. The finished suspension is withdrawn at 7.

It will be understood by those skilled in the art that this procedure may be modified without departing from the spirit of the invention. For example, the percent of the concentrated superphosphate added to the water in the first step may be varied over a wide range to control the amount of gelling provided when the ammonia is introduced in a later mixing step.

Referring now more specifically to FIGURE 2, I have shown an illustration of the effect of adding different amounts of superphosphate in the first portion on the physical properties of a typical suspension prepared by my new process. It is readily seen from this illustration that the viscosity and the pourability of a typical suspension are determined by the amount of superphosphate added in the first portion, as described in the explanation of FIGURE 1. I have found that the extent of the gel formation caused by the precipitation of calcium ammonium phosphate can be controlled by varying the amount of superphosphate added in the first portion. This makes it possible to produce suspensions using the same formulation, with a wide range of values for viscosity, pourability and degrees of settling. I have found that for most suspension grades the preferred amount of superphosphate to add in the first portion is from about 10 to about 40 percent of that used in the formulation. However, limited data has shown that for some formulations superior properties may be obtained when somewhat over 40 percent is added in the first portion. Furthermore, the order of adding the materials, after completion of the first step in the batch procedure, is not restricted to the procedure as described in the illustration.

Several variations of this procedure are within the scope of this invention. For example, continuous rather than batch operation can be accomplished by using two vessels in line. The water and an essential portion of concentrated superphosphate are fed continuously to the first vessel and mixed during a retention time in the vessel of about 1 to 10 minutes. This pre-mix of water and concentrated superphosphate, the supplemental nitrogen material, the potash material, ammonia, and the remainder of the concentrated superphosphate are then fed continuously to the second vessel and mixed during a retention time in the vessel of about 5 to 10 minutes. The finished suspension product is withdrawn continuously from this second vessel.

The materials used may also be varied. Although anhydrous ammonia ordinarily is used to ammoniate superphosphate when used in dry fertilizers, it is within the scope of this invention to use it either in the anhydrous form or in aqueous solution. The solution may also contain supplemental nitrogen salts such as urea and ammonium nitrate and the like. Supplemental nitrogen salts in the solid form may also be selected from a group such as urea, ammonium nitrate, ammonium phosphates, ammonium sulfate and the like. The primary phosphatic material suitable for use in suspension fertilizers in the present invention is concentrated superphosphate made by reacting phosphate rock with phosphoric acid of various concentrations. However, other sources of phosphate may be used, but only to act as supplemental sources of phosphate—not as a substitute or equivalent to concentrated superphosphates. Such supplemental sources may be ammonium phosphates, potassium phosphates, calcium metaphosphate and superphosphate made from phosphate rock and sulfuric acid. It is essential to use the concentrated superphosphate in order to derive the desired suspension characteristics. Suitable sources of potash are potassium chloride, potassium phosphates, potassium sulfate, potassium nitrate and the like.

The particle size of the solid fertilizer materials is important in any suspension fertilizer process. I have found that if the initial maximum particle size is about 20 mesh or smaller for raw materials used in my process, the resulting suspensions gave no difficulty from settling of solid particles.

By using the methods as described above, it is possible to produce suspension fertilizers with good handling properties and high plant-food content. However, if the novel features of this process are not used, the solid fertilizer particles will settle rapidly and form a dense cake on the bottom of containers, thereby making the product unusable.

By using this novel process I am able to incorporate considerably more ammonia per unit (20 pounds) of $P_2O_5$ into fertilizer formulations than is normally used in granular or pulverized fertilizers containing superphosphate. Ordinarily about 4 pounds of ammonia per uit of $P_2O_5$ is the maximum amount used to ammoniate superphosphate in such fertilizers. However, my new process permits the use of up to about 8 pounds of ammonia per unit of $P_2O_5$ from superphosphate in formulating suspension fertilizers with good properties. This permits a saving in the raw-material cost for nitrogen.

In order that those skilled in the art may better understand how the present invention can be practiced, the following examples are given by way of illustration, and not by way of limitation.

*Example I*

A 12–12–12 suspension (12 percent each by weight of N, $P_2O_5$, and $K_2O$) was prepared by mixing the water and 20 percent of the concentrated superphosphate (46 percent $P_2O_5$, minus 20 mesh) required for the formulation, in a batch mixing tank for about 1 minute. Subsequently the supplemental nitrogen material (solution of urea-ammonium nitrate), the potash material (minus 20 mesh potassium chloride), the ammonia (28 percent ammonia solution in water), to supply 6 pounds of ammonia per 20 pounds (1unit) of $P_2O_5$, and the remaining 80 percent of the concentrated superphosphate were weighed rapidly into the batch in that order. Mixing was continued during addition of all the raw materials and for 4 minutes thereafter. The maximum temperature during mixing steps was 110° F.

The resulting suspension had the following properties after 1 day of storage:

Settling, percent by volume _____ 8
Apparent viscosity, cps. _____ 302
Product pourability, percent by weight _____ 91
pH _____ 6.3
Plus 20 mesh particles, percent by weight _____ 1.0

These properties are considered to be satisfactory for handling and applying to the soil after short periods of storage.

*Example II*

This example illustrates the criticality of first mixing the water and a portion of concentrated superphosphate prior to the addition of the other materials and the subsequent addition of the remainder of the concentrated superphosphate.

A 12–12–12 suspension was prepared from the same raw materials used in Example I. The mixing procedure was a simple addition of the solid materials to a mixture of all the liquid raw materials described as follows: The liquid row materials (1) water, (2) urea-ammonium nitrate solution, and (3) the ammonia solution were added to a batch mixing tank and thoroughly mixed before successively adding the concentrated superphosphate and the potassium chloride. Agitation was continued for about 5 minutes after addition of the last ingredient. The maximum temperature during the mixing steps was 120° F.

The resulting product had the following properties after 1 day of storage.

Settling, percent by volume _____ 35
Apparent viscosity, cps. _____ 28
Product pourability, percent by weight _____ 28
pH _____ 6.5
Plus 20 mesh particles, percent by weight _____ 4.9

Such properties are considered to be unsatisfactory for suspension fertilizers due to the settling of solids that form a dense hard layer in the bottom of containers making the product unusable.

*Example III*

A suspension was prepared as in Example I, however, a greater amount of less expensive ammonia was used to ammoniate the concentrated superphosphate. Eight pounds of ammonia per 20 pounds (one unit) of $P_2O_5$ was used instead of 6 pounds. This permitted the use of less of the more expensive urea-ammonium nitrate solution in the formulation. This product had the same high $P_2O_5$ availability as the superphosphate used in the formulation.

The resulting suspension had the following properties after 1 day of storage.

Settling, percent by volume _____ 4
Apparent viscosity, cps. _____ 172
Product pourability, percent by weight _____ 97
pH _____ 8.1
Plus 20 mesh particles, percent by weight _____ 1.6

*Example IV*

A 6–24–0 suspension (6 percent by weight of N, and 24 percent by weight of $P_2O_5$) was prepared by mixing the water and 40 percent of the concentrated superphosphate (46 percent $P_2O_5$, minus 20 mesh) required for the formulation, in a batch mixing tank for about 1 minute. Subsequently the ammonia required to furnish all the nitrogen was added to the mixer as a 28 percent solution in water while mixing was continued. This amount of ammonia is equivalent to about 6.2 pounds per 20 pounds (1 unit) of $P_2O_5$. Immediately after introduction of the ammonia, the remaining 60 percent of the superphosphate was added in about 2 minutes while agitating the slurry. Mixing was continued for about 5 minutes after adding all the superphosphate. The maximum temperature during the mixing steps was 178° F.

The resulting suspension had the following properties after 1 day of storage.

| | |
|---|---|
| Settling, percent by volume | 0 |
| Apparent viscosity, cps. | 620 |
| Product pourability, percent by weight | 96 |
| pH | 7.8 | batch in that order. Mixing was continued during addition of all the raw materials and for about 4 minutes thereafter. The maximum temperature during the mixing steps was 124° F.

The resulting suspension after 1 day of storage had the following physical properties.

| | |
|---|---|
| Settling, percent by volume | 13 |
| Apparent viscosity, cps. | 110 |
| Product pourability, percent by weight | 87 |
| pH | 8.2 |
| Plus 20 mesh particles, percent by weight | 2.3 |

For a still more thorough understanding and complete disclosure, the following tabulation generally illustrates more specific details relating to the amounts and types of materials used to arrive at the formulations set forth in the above six examples.

| Raw Materials | Example No. | | | | | |
|---|---|---|---|---|---|---|
| | 1 | 2 | 3 | 4 | 5 | 6 |
| | Pounds per ton | | | | | |
| Water | 25 | 256 | 233 | 435 | 440 | 233 |
| Superphosphate, 46% $P_2O_5$ (minus 20 mesh): | | | | | | |
| First portion | 104 | 104 | 104 | 417 | 70 | 104 |
| Second portion | 418 | 418 | 418 | 626 | 626 | 418 |
| Aqua ammonia, 28% $NH_3$ | 257 | 257 | 343 | 522 | 348 | |
| Urea-ammonium nitrate solution, 32% N | 578 | 578 | 515 | | | |
| Ammoniating solution, percent: | | | | | | |
| $NH_3$=11.2 | | | | | | |
| $NH_4NO_3$=26.6 | | | | | | 858 |
| Urea=21.2 | | | | | | |
| Potassium chloride, 62% $K_2O$ (minus 20 mesh) | 387 | 387 | 387 | | 516 | 387 |
| Totals | 2,000 | 2,000 | 2,000 | 2,000 | 2,000 | 2,000 |

Such properties are considered to be satisfactory for handling and applying to the soil after short storage periods.

*Example V*

A 4-16-16 suspension (4 percent by weight of N, and 16 percent by weight of $P_2O_5$ and $K_2O$) was prepared by mixing the water and 10 percent of the concentrated superphosphate required for the formulation, in a batch mixing tank for about 1 minute. Subsequently the ammonia (28 percent ammonia solution in water), to supply all the nitrogen, the potash material (minus 20 mesh potassium chloride) and the remaining 90 percent of the superphosphate were weighed rapidly into the batch in that order. Mixing was continued during the addition of all the raw materials and for about 5 minutes thereafter. The maximum temperature during the mixing steps was 130° F. The resulting suspension had very good physical properties after storage for 1 day as shown in the following tabulations.

| | |
|---|---|
| Settling, percent by volume | 2 |
| Apparent viscosity, cps. | 330 |
| Product pourability, percent by weight | 96 |
| pH | 7.2 |

*Example VI*

A 12-12-12 suspension 12 percent each by weight of N. $P_2O_5$, and $K_2O$) was prepared by mixing the water and 20 percent of the concentrated superphosphate (46 percent $P_2O_5$, minus 20 mesh) required for the formulation, in a batch mixing tank for about 1 minute. Subsequently the required amount of an ammoniating solution containing urea, ammonium nitrate and enough ammonia (11.2 percent) to supply 8 pounds of ammonia per 20 pounds (1 unit) of $P_2O_5$, the potash material (minus 20 mesh potassium chloride) and the remaining 80 percent of the superphosphate were weighed rapidly into the While I have shown and described particular embodiments of my invention, modifications and variations thereof will occur to those skilled in the art. I wish it to be understood therefore that the appended claims are intended to cover such modifications and variations which are within the true scope and spirit of my invention. I further wish it to be understood that although the appended claims are drawn in a manner relating to batchwise operation of my processes, said processes obviously, as is indicated above, may be carried out in a continuous operation and therefore said claims are intended to be construed to my process in either batchwise or continuous operation.

What I claim as new and desire to secure by Letters Patent of the United States is:

1. The improved method of producing a stable suspension type fertilizer having high plant food content, good flow properties, and low viscosity, which comprises the steps of admixing water and a first portion of concentrated superphosphate together in a mixing vessel, said first portion of concentrated superphosphate comprising from about 10 percent to about 40 percent by weight of the total concentrated superphosphate to be added to said suspension; agitating said mixture for a period from about 1 to about 10 minutes; subsequently thereafter adding supplemental nitrogen source materials to said mixing vessel, said supplemental nitrogen source materials selected from the group consisting of urea, ammonium sulfate, ammonium nitrate, ammonium phosphates, and mixtures thereof; thereafter adding a source of potash-supplying material to said mixing vessel, said potash-supplying material selected from the group comprising potassium chloride, potassium phosphate, potassium sulfate, potassium nitrate, and mixtures thereof; thereafter adding a source of ammonia-supplying material to said mixing vessel, said source of ammonia selected from the group consisting of anhydrous ammonia and aqueous ammonia; subsequently thereafter adding the second portion of said concentrated superphosphate to said mixing vessel, said second portion of concentrated superphosphate being 100 percent of the total added thereto less the percentage added by said first portion addition; thereafter agitating said resulting suspension for a period of approximately 5 to 10 minutes; and withdrawing as product a stable suspension type fertilizer of high analysis characterized by the formation of a stable gel precipitated during said mixing steps, said gel exhibiting suspending properties to such an extent as to obviate the necessity for addition of a foreign suspending agent.

2. The improved method of producing a stable suspension type fertilizer having high plant food content, good flow properties, and low viscosity, which comprises the steps of admixing water and a first portion of concentrated superphosphate together in a mixing vessel, said first portion of concentrated superphosphate comprising about 20 percent by weight of the total concentrated superphosphate to be added to said suspension; agitating said mixture for a period from about 1 to about 10 minutes; subsequently thereafter adding supplemental nitrogen source materials to said mixing vessel, said supplemental nitrogen source materials selected from the group consisting of urea, ammonium sulfate, ammonium nitrate, ammonium phosphates, and mixtures thereof; thereafter adding a source of potash-supplying material to said mixing vessel, said potash-supplying material selected from the group consisting of potassium chloride, potassium phosphate, potassium sulfate, potassium nitrate, and mixtures thereof; thereafter adding a source of ammonia-supplying material to said mixing vessel, said source of ammonia selected from the group consisting of anhydrous ammonia and aqueous ammonia; subsequently thereafter adding the second portion of said concentrated superphosphate to said mixing vessel, said second portion of concentrated superphosphate being 100 percent of the total added thereto less the percentage added by said first portion addition; thereafter agitating said resulting suspension for a period of approximately 5 to 10 minutes; and withdrawing as product a stable suspension type fertilizer of high analysis characterized by the formation of a stable gel precipitated during said mixing steps, said gel exhibiting suspending properties to such an extent as to obviate the necessity for addition of a foreign suspending agent.

References Cited

UNITED STATES PATENTS

| | | | |
|---|---|---|---|
| 2,487,600 | 11/1949 | Schneiderwirth | 252—317 |
| 2,605,229 | 7/1952 | Marcus | 252—317 |
| 3,148,970 | 9/1964 | Smith et al. | 71—36 X |
| 3,206,298 | 9/1965 | Smalter | 71—43 X |
| 3,234,005 | 2/1966 | Smalter et al. | 71—29 |

DONALL H. SYLVESTER, *Primary Examiner.*

T. D. KILEY, *Assistant Examiner.*